United States Patent [19]

Kohn et al.

[11] Patent Number: 5,074,891

[45] Date of Patent: Dec. 24, 1991

[54] METHOD OF GAS SEPARATION AND MEMBRANES THEREFOR

[75] Inventors: Rachel S. Kohn, Springfield; Sidney R. Jones, Randolph, both of N.J.; Werner H. Mueller, Corpus Christi, Tex.

[73] Assignee: Hoechst Celanese Corp., Somerville, N.J.

[21] Appl. No.: 386,528

[22] Filed: Jul. 27, 1989

[51] Int. Cl.[5] .................. B01D 53/22; B01D 71/64
[52] U.S. Cl. ........................................... 55/16; 55/68; 55/158
[58] Field of Search .................... 55/16, 68, 158; 210/500.39

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 |
| 3,899,309 | 8/1975 | Hoehn et al. | 55/16 |
| 4,113,628 | 9/1978 | Alegranti | 210/500.39 X |
| 4,240,914 | 12/1980 | Iwama et al. | 210/500.39 |
| 4,378,324 | 3/1983 | Makino et al. | 210/500.39 X |
| 4,378,400 | 3/1983 | Makino et al. | 55/16 X |
| 4,440,643 | 4/1984 | Makino et al. | 210/500.39 X |
| 4,474,662 | 10/1984 | Makino et al. | 210/500.39 |
| 4,485,056 | 11/1984 | Makino et al. | 210/500.39 X |
| 4,528,004 | 7/1985 | Makino et al. | 55/16 X |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 55/16 X |
| 4,830,640 | 5/1989 | Nakamura et al. | 55/16 X |
| 4,838,900 | 6/1989 | Hayes | 55/16 |
| 4,851,014 | 7/1989 | Jeanes | 55/16 |
| 4,857,079 | 8/1989 | Kimura | 55/16 |
| 4,897,092 | 1/1990 | Burgoyne, Jr. et al. | 55/16 |

FOREIGN PATENT DOCUMENTS 2098994 12/1982 United Kingdom ................. 55/16

*Primary Examiner*—Robert Spitzer
*Attorney, Agent, or Firm*—Joseph M. Mazzarese

[57] ABSTRACT

An improved method of gas separation and novel polyimide membranes are disclosed and claimed. Membranes in accordance with the present invention include the condensation product of fluorinated diamines such as 2,2'-bis(3-aminophenyl)hexafluoropropane, 2,2'-bis(4-aminophenyl)hexafluoropropane and 2-(3-aminophenyl)-2'-(4-aminophenyl)hexafluoropropane with aromatic dianhydrides such as 3,3', 4,4' benzophenone tetracarboxylic acid dianhydride.

18 Claims, 1 Drawing Sheet

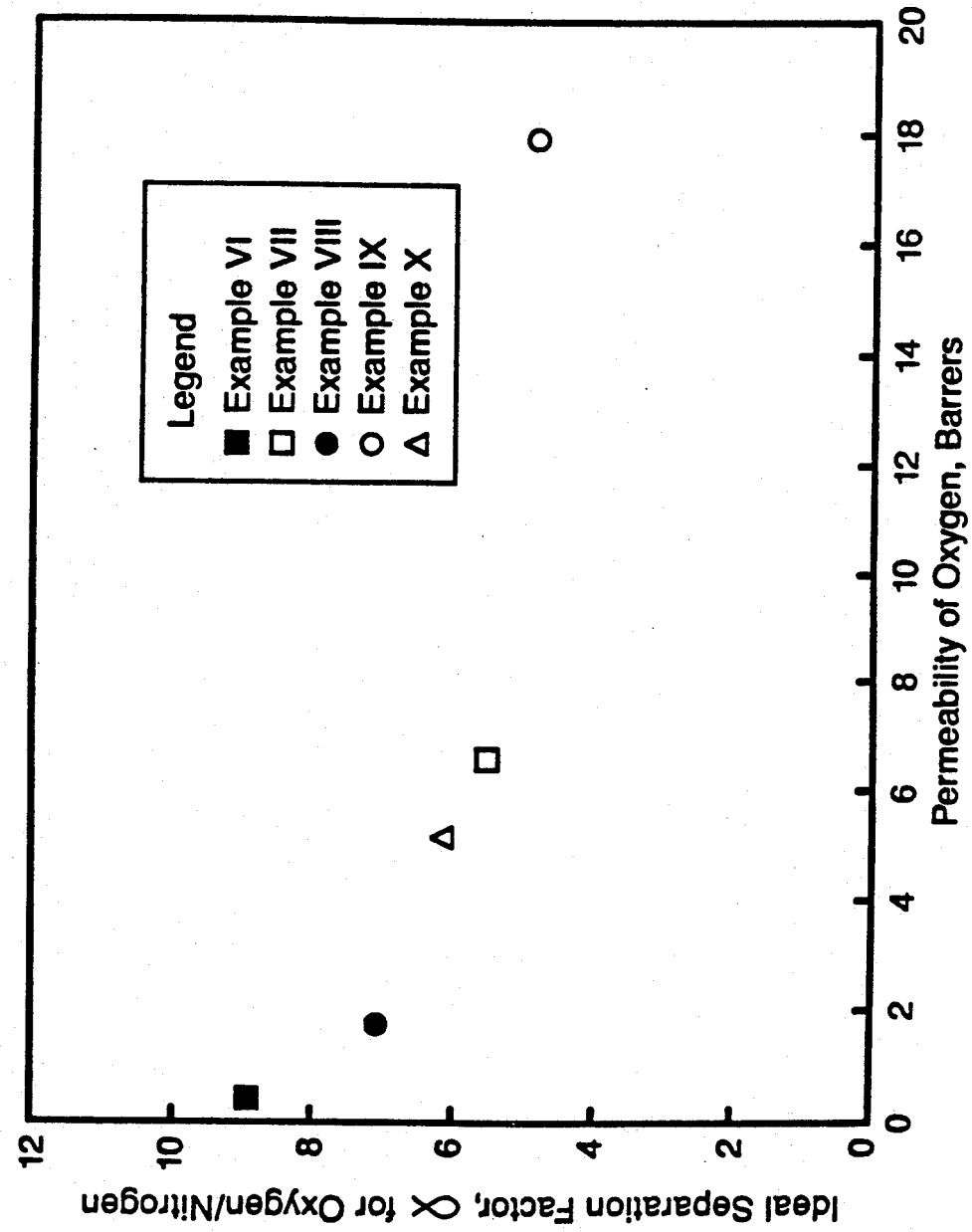

METHOD OF GAS SEPARATION AND MEMBRANES THEREFOR

TECHNICAL FIELD

The present invention relates generally to gas separation by way of permeable membranes and more specifically to such techniques utilizing a polyimide material containing the hexafluoropropane and like moieties.

BACKGROUND ART

It is well known to employ permeable membranes to separate or selectively enrich a gas mixture. For example, membranes are used in separation of $H_2$ from supercritical gases such as $N_2$, CO and $CH_4$; the separation of $CO_2$ and water vapor from natural the enrichment of air by nitrogen or oxygen. Hydrogen is recovered from ammonia production plants using large scale membrane technology and likewise, the recovery of $H_2$ from coal for the production of synthetic fuel is possible.

The fundamentals of gas separation are based upon the permeability equation, which at low pressures in the absence of strong interactions between components may be expressed as:

$$\alpha_{AB} = P_A/P_B$$

Where:
   $\alpha_s$ is referred to as the ideal separation factor.
   $P_A$ is the permeability of component A in the membrane.
   $P_s$ is the permeability of component B in the membrane.

The separation of gas components by polymer membranes is thought to depend on chemical affinities, kinetic diameters and structural characteristics; it being known very generally that rubbery polymers are characterized by high diffusion and relatively low selectivity while glassy polymers are characterized by lower diffusion and higher selectivities. In any given situation, however, it is impossible to predict separation in the absence of experimental data with any reasonable degree of confidence.

Much of the work in the field has been directed to developing membranes which optimize the separation factor and total flux of a given system. It is disclosed in U.S. Pat. No. 4,717,394 to Hayes that aromatic polyimides containing the residue of alkylated aromatic diamines are useful in separating a variety of gases. Moreover, it has been reported in the literature that other polyimides, polycarbonates, polyurethanes, polysulfones and polyphenyleneoxides are useful for like purposes.

It has now been found, in accordance with the present invention, that certain polyimides with the residuum of a diaryl fluorine-containing diamine moiety are useful in separation processes involving, for example $H_2$, $N_2$, $CH_4$, CO, $CO_2$, He and $O_2$ by virtue of the fact that these polymers exhibit both high flux rate and separation factors.

SUMMARY OF INVENTION

The present invention includes a novel process and membranes therefor utilizing a polyimide having recurring units of the

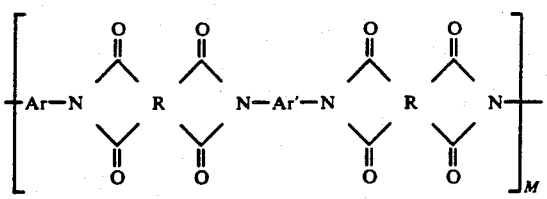

where:
m is an integer from about 15 to about 250
R is a tetravalent aromatic radical selected from the group consisting of:

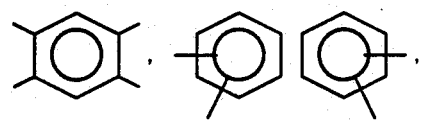

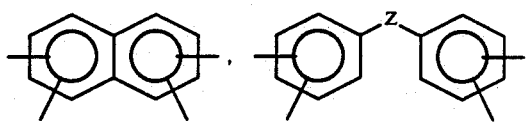

Z is a divalent radical selected from:

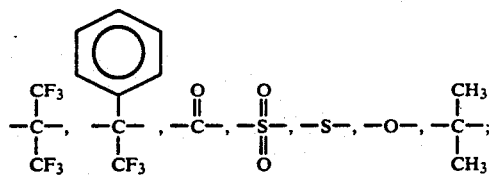

Ar is:

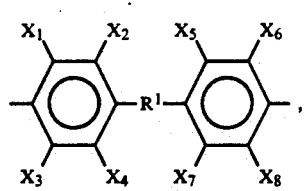

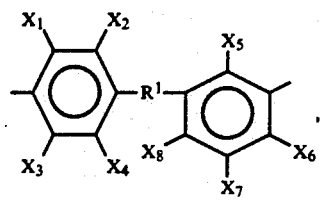

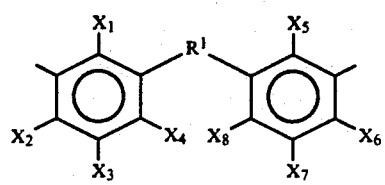

$X_1 \ldots X_8$; being defined hereinbelow:

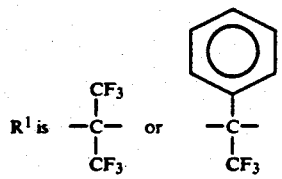

or mixtures thereof;
Ai is:

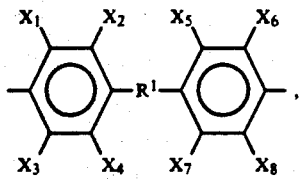

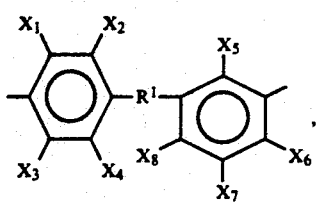

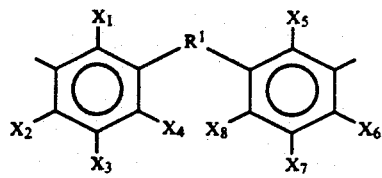

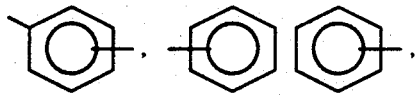

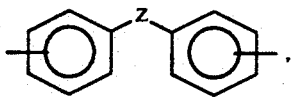

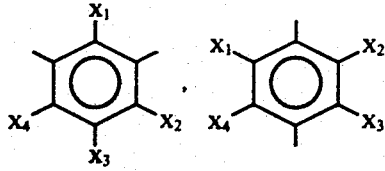

R', Z being defined as hereinabove;
$X_1 \ldots X_8$ are independently H, alkyl groups with 1-6 carbon atoms, preferably methyl groups; Br, Cl; or aromatic groups with 6-13 carbons.

Gas separation in accordance with the present invention is characterized by both high permeabilities and separation factors.

In specific embodiments there are provided membranous polyimide structures formed of the condensation products of 2,2'-bis(3-aminophenyl)hexafluoropropane and 3,3', 4,4'bis(3-aminophenyl)hexafluoropropane and 2,2-bis(3,4-dicarboxyphenyl)hexafluoropropane dianhydride; 2,2-bis(4-amin hexafluoropropane and 2,2-bis(3,4 dicarboxy)hexafluoropropane dianhydride; 2,2'-bis(4-aminophenyl)hexafluoropropane and 3,3, '4,4'diphenyl tetracarboxylic acid dianhydride; and 2-(3-aminophenyl)-2-(4-aminophenyl)hexafluoropropane and 2,2;-bis(3,4-dicarboxyphenyl)hexafluoropropane dianhydride.

As will be appreciated by one of skill in the art the term "membrane" or "membranous structure" refers, without limitation, to structures used in gas separation such as thin films, thick films, composite structures, asymmetric structures, hollow fibers, modules and like items. Likewise it will be appreciated that the polyimides formed from the dianhydrides and diamines illustrated in specific embodiments could be copolymerized with each ether or for example, with one or more of the following diamines or
m-phenylene diamine;
p-phenylene diamine;
1,3-bis(4-aminophenyl) propane;
2,2-bis(4-aminophenyl) propane;
4,4'-diamino-diphenyl methane;
1,2-bis(4-aminophenyl) ethane;
1,1-bis(4-aminophenyl) ethane;
2,2'-diamino-diethyl sulfide;
bis(4-aminophenyl) sulfide;
2,4'-diamino-diphenyl sulfide;
bis(3-aminophenyl) sulfone;
bis(4-aminophenyl) sulfone;

4,4'-diamino-dibenzyl sulfoxide;
bis(4-aminophenyl) ether;
bis(3-aminophenyl) ether;
bis(4-aminophenyl)diethyl silane;
bis(4-aminophenyl) diphenyl silane;
bis(4-aminophenyl) ethyl phosphine oxide;
bis(4-aminophenyl) phennl phosphide oxide;
bis(4-aminophenyl)-N-phenylamine;
bis(4-aminophenyl)-N-nethylamine
1,2-diamino-napththalene
1,4-diamino-naphthalene;
1,5-diamino-naphthalene;
1,6-diamino-naphthalene;
1,7-diamino-naphthalene;
1,8-diamino-naphthalene;
2,3-diamino-naphthalene;
2,6-diamino-naphthalene;
1,4-diamino-2-ethyl-naphthalene;
1,5-diamino-2-methyl-naphthalene;
1,3-diamino-2-phenyl-naphthalene;
4,4'-diamino=biphenyl;
3,3'-diamino-biphenyl;
3,3'-dichloro-4,4'-diamino-biphenyl;
3,3'-dimethyl-4,4'-diamino-biphenyl;
3,4'-dimethyl-4,4'-diamino-biphenyl;
3,3'-dimethoxy-4,4'-diamino-biphenyl;
4,4'-bis(4-aminophenoxy)-biphenyl;
2,4-damino-toluene;
2,5-diamino-toluene;
2,6-diamino-toluene;
3,5-diamino-toluene;
1,3-diamino-2,5-dichloro-benzene;
1,4-diamino-2,5-dichloro-benzene;
1-methoxy-2,4-diamino-benzene
1,4-diamino-2-methoxy-5-methyl-benzene;
1,4-diamino-2,3,5,6-tetramethyl-benzene;
1,4-bis(2-methyl-4-amino-pentyl)-benzene;
1,4-bis(1,1-dimethyl-5-amino-pentyl)-benzene;
1,4-bis(4-aminophenoxy)-benzene;
o-xylylene diamine;
m-xylylene diamine;

p-xylylene diamine;
3,3'-diaminobenzophenone;
4,4'-diamino-benzophenone;
2,6-diamino-pyridine;
3,5-diamino-pyridine;
1,3-diamino-adamantane;
3,3'-diamino-1,1-diadamantane;
N-(3-aminophenyl)-4-aminobenzamide:
4-aminophenyl-3-aminobenzoate;
2,2-bis[4-(4-aminophenoxy)phenol)hexafluoropropane;
2,2-bis[4-(2-chloro-4-aminophenoxy)phenyl hexafluror-propane;
1,1-bis(4-aminophenyl-1-phenyl-2,2,2-trifluoroethane;
1,1-bis[4-(4-aminophenoxy)phenyl -1-pehnyl-2,2,2-triflurorethane;
1,4-bis(3-aminophenal)buta-1-ene-3-ene;
1,5-bis(3-aminophenyl) decafluodentene; and mixtures thereof.
1,2,4,5-benzene tetracarboxylic acid diaphydride;
1,2,3,4-benzene tetracarboxylic acid dianhydride;
1,4-bis(2,dicarboxy-..phenoxy) benzene dianhydride;
1,3-bis(3,4-dicarbopypnenoxy) benzene dianhydride;
2,4,5-naphthalene tetracarboxylic acid dianhydride;
1,2,5,6-naphthalene tetracarboxylic acid dianhydride;
1,4,5,8-naphthalene tetracarboxylic acid dianhydride;
2,3,6,7-naphthalene tetracarboxylic acid dianhydride;
2,6-dichloronaphthalene-1,4,5,8-tetracarboxylic acid dianhydride;
2,7-dichloronaphthalene-1,4,5,8-tetracarboxylic acid dianhydride;
2,3,6,7-tetrachloronaphthalene-1,4,5,8-tetracarboxylic acid dianhydride;
2,2',3,3'-diphenyl tetracarboxylic acid dianhydride;
4,4'-bis(3,4-dicarboxyphenoxy)diphenyl dianhydride;
bis(2,3-dicarboxyphenyl) ether dianhydride;
4,4'-bis(2,3-dicarboxyphenoxy) diphenyl ether dianhydride;
4,4'-bis(3,4-dicarboxyphenoxy) diphenyl ether dianhydride;
4,4'-bis(3,4-dicarboxyphenyl) sulfide dianhydride; dianhydride;
bis(3,4-dicarboxyphenyl) sulfide dianhydride;
4,4'-bis(2,3-dicarboxyphenoxy) diphenyl sulfide dianhydride;
4,4'-bis(3,4-dicarboxyphenoxy) diphenyl sulfide dianhydride;
bis(3,4-dicarboxy-phenyl) sulfone dianhydride;
4,4'-bis(2,3-dicarboxenoxy diphenyl sulfone dianhydride;
4,4'-bis(3,4-dicarboxypheno..xy) diphenyl sulfone dianhydride;
2,2',3,3'-benzophenone tetracarboxylic acid dianhydride;
2,3,3'4',-benzophenone tetracarboxylic acid dianhydride;
4,4'-bis(3,4-dicarboxyphenoxy) benzophenone dianhydride;
bis(2,3-dicarboxyphenyl) methane dianhydride;
bis(3,4-dicarboxyphenyl) methane dianhydride;
1,-bis(2,3-dicarboxythenyl) ethane dianhydride;
1,1-bis(3,4-dicarboxyphenyl) ethane dianhydride;
1,2-bis(3,4-dicarboxyphenyl..) ethane dianhydride;
2,2-bis(2,3-dicarboxy..phenyl) propane dianhydride;
2,2-bis(3,4-dicarboxypheny..1) propane dianhydride;
2,2-bis[4-(2,3-dicarboxyphenoxy) phenyl]propane dianhrydride;
2,2-bis[4-(3,4-dicarboxyphenoxy) phenyl]propane dianhydride;
4-(2,3-dicarboxyphenoxy)-4'-(3,4-dicarboxy..phenoxy) diphenyl-2,2-propane dianhydride;
2,2-bis[4-(3,4-dicarboxyphenoxy-3,-dipethyl) phenyl]propane dianhydride;
2,3,4,5-thiophene tetracarboxylic acid dianhydride;
2,3,4,5-pyrrolidine tetracarboxylic acid dianhydride;
2,3,5,6-pyrazine tetracarboxylic acid dianhydride;
8,9,10tracarboxylic acid dianhydride;
3,4,9,10-porylene tetracarboxylic acid dianhydride;
1,3-bis(3,4-dicarboxyp-henyl) h®xafluoropropane dianhydride;
1,1-bis(3,4-dicarboxyp-henyl)-I--phenyl-2,2,2-trifluoroethane dianhydride;
2,2-bis[4-(3,4-dicarboxyphenoxy) phenyl]hexafluoropropane dianhydride;
1,1-bis[4-(3,4-dicarboxyp-henoxy) phenyl]-i-phenyl-2,2,2-trifluoroethane dianhydride: and
4,4'-bis[2-(3,4-dicarboxyphenyl)hexafluoroisopropyl]-diphenyl ether dianhydride.
without changing the basic and novel characteristics of the inventive process and membranes.

BRIEF DESCRIPTION OF THE FIGURE

The invention is described in detail below with reference to a single figure which is a graph of the ideal separation factor with respect to an oxygen/nitrogen system against the permeability of oxygen for the examples given hereinafter.

DETAILED DESCRIPTION

A series of polyimides was synthesized using various dianhydrides and diamines containing the hexafluoropropane moiety. In general, this procedure involves the polycondensation of a diamine and dianhydride followed by the dehydration of the resulting polyamic acid to form a polyimide. More specifically, equimolar amounts of dianhydride and diamine are utilized in accordance with the process described in copending patent application U.S. Ser. No. 217,929 filed July 12, 1988 of R. Vora et al., the disclosure of which is incorporated by reference herein.

For purposes of brevity only, and not by way of limitation, certain terminology, measurements and procedures are now enumerated. Unless otherwise indicated, terms are used throughout as indicated below.

INHERENT VISCOSITY

The inherent viscosity of polymer samples was obtained by measuring the viscosity of the polymer solution and the solvent and the inherent viscosity (IV) wa calculated from the following equation:

$$\text{Inherent Viscosity} = \frac{\text{Natural Logarithm}\left(\frac{\text{Viscosity of Polymer Solution}}{\text{Viscosity of Solvent}}\right)}{C}$$

where C is the concentration expressed in grams of polymer per 100 milliliters of solution. In all cases, inherent viscosity was measured using 0.5 grams of polymer or reaction mixture in 100 ml of dimethyl acetamide at 25 degrees Celsius.

MOLECULAR WEIGHT DATA

The molecular weight of the polymers, whether weight average molecular weight, $M_w$ or number average molecular weight $M_n$ were measured by gel permeation chromatography (GPC) performed on dilute solutions of the polymer. The apparatus employed consists generally of a programmable automatic sampler, vacuum pump, chromatography columns, and a differential refractometer connected to a data reduction system with accompanying software. The system is calibrated using multiple standards which are currently available. With the system thus calibrated, the weight average molecular weight $M_w$, the number average molecular weight $M_n$, and polydispersity, $M_w/M_n$ were obtained for polymers produced in accordance with the examples given hereinafter.

GLASS TRANSITION TEMPERATURE

Glass transition temperatures (Tg's) were determined by differential scanning calorimetry. Glass transition temperature by this method is generally defined as the point of intersection of tangent lines about the point of first inflection of the heating curve of the polymer.

TGA

Thermogravimetric analysis was performed at 20° C./min with an air rate of 80cc/min. TGA values given herein are for five percent (5%) weight loss; in other words the temperature at which 5% weight loss occurred using this procedure is reported in Table 2.

REACTANTS

Monomers used in accordance with the examples which follow are preferably substantially analytically pure; for example, "electronic" grade dianhydride is preferred. This material contains more that 98.5% dianhydride, less that 1.5% of the corresponding monoanhydride-diacid and less than 0.1% of the corresponding tetra-acid. The 2,2'-bis(3,4-dicarboxyphenyl) hexafluoropropane dianhydride referred to herein (6FDA) is available from Hoechst-Celanese Corporation, Route 202-206 North, Somerville, New Jersey 08876. Electronic grade danhydride contains less than 10 ppm sodium, less than 5 ppm iron, less than 2 ppm cobalt and less that 2 ppm manganese, and has a melting point of 246.5 degrees Celsius.

Diamine utilized in accordance with the present invention is also preferably substantially analytically pure. For example, to obtain the preferred purity of the diamines noted hereinafter, an available grade or synthesized grade of 2,2-bis(4-aminophenyl) hexafluoropropane or 2,2-bis(3-aminophenyl) hexafluoropropane may be dissolved in aqueous hydrochloric acid and treated with activated charcoal stirred for thirty minutes and filtered. The treatment is repeated as necessary to remove color impurities. The aqueous solution obtained after repeated filtering is treated with ammonium hydroxide until the pH of the resulting slurry is about 9. The diamine slurry is then filtered and washed with de-ionized or distilled water to form a filter cake, which in turn is redissolved in methanol and clarified through a five micron or smaller filter. Subsequently, diamine is precipitated from the methanol solution by the addition of distilled or de-ionized water and washed, also with water. The moist diamine is dried overnight in a vacuum oven and contains less than 10 ppm iron, sodium and chloride ions. Further information concerning diamines may be found in copending application Serial No. 105,857 filed Oct. 7, 1987, the disclosure of which is incorporated herein by reference.

Example I - Polyimide of BTDA and 3,3'Diamine

This example relates to a polymer of 2,2-bis(3-aminophenyl)hexafluoropropane and 3,3', 4,4' benzophenone tetracarboxylic acid dianhydride BTDA. A 3 neck flask was fitted with a stirrer, condenser, ice water bath, thermometer and nitrogen atmosphere. To the flask, 36.74 gm (0.11 mole) of 2,2-bis(3-aminophenyl) hexafluoropropane along with 200 grams of freshly distilled N-methyl pyrrolidone (NMP) was charged. The mixture was agitated for several minutes at room temperature to get a clear, slightly yellow solution. The solution was then cooled to below room temperature (about 15° C.) and 35.981 grams of BTDA was added portion wise in equal intervals and amounts over a period of about thirty minutes. Based on 98.5% purity, 35.981 grams of a commercially available high purity polymer grade of BTDA would be 0.11 mole. The addition of anhydride must be carefully executed while the reaction mixture is agitated gently so that the solution is maintained between 15 and 25 degrees Celsius. After BTDA addition, the beakers containing monomers were washed with an additional 212.10 grams of NMP and the NMP and residual monomer was added to the reaction mixture to obtain a solution of twenty per cent non volatile concentration. The mixture, maintained at a uniform temperature between about 25 and 30 degrees Celsius is agitated gently for about 20 hours and a sample of the polyamic acid formed is withdrawn for viscosity analysis. To the polymerized mixture, 8.58 grams of beta-picoline are added and fully dispersed. After the beta-picoline 85.80 grams of acetic anhydride were subsequently added dropwise and the mixture is agitated gently for an additional twenty-two hours (also at 25°-30° C., uniform temperature) to complete cyclization. The above process, and those described below, were all carried out in a dry nitrogen atmosphere and reactants are all added in portions so that undesirable effects are avoided. Likewise, it is important to keep the temperature of the reaction mixture suitably uniform in all steps; for example, if the temperature is allowed to elevate locally, even during cyclization, the reaction mixture may gel and not form suitable polymer.

The polymer formed as above was precipitated from solution, in methanol by the addition of methanol to the reaction liquor, that is by reverse precipitation, using 2000 ml. of methanol for every 500g of polymeric solution. The resulting polymer is then washed with additional fresh methanol. Properties of the polymer (after drying) and polyamic acid appear in Table 1.

Example II - Polyimide of BPDA and 4,4'Diamine

Following the procedure of Example I, the following materials were used:
334 grams 2,2-bis(4-aminophenyl) hexafluoropropane
95.68 grams BPDA (3,3,,4,4, biphenyl tetracarboxylic acid dianhydride)
2518.00 grams freshly distilled NMP
797 grams acetic anhydride
79.70 grams beta-picoline.
Reaction times and temperatures (app roximate) appear below:

| | |
|---|---|
| Reactant mixing in 1000 g NMP: | 52 minutes |
| Polymerization time at 20 percent concentration: | 20 hours |
| Polymerization temperature: | 20-25° C. |
| Cyclization time: | 21 hours |

-continued

| Cyclization temperature: | 20-25° C. |

Data on the polymer and intermediate polyamic acid appears in Table 1.

Example III - Polyimide of 6FDA/3,3'Diamine

Following the procedure of Example I, the following materials were used:
267.20 grams 2,2-bis(3-aminophenyl) hexafluoropropane
355.20 grams 6FDA (2,2-bis(3,4 dicarboxypheny) hexafluoropropane dianhydride)
2490 grams freshly distilled NMP
782.00 grams acetic anhydride
7820 grams beta-picoline.
Reaction times and temperatures (approximate) appear below:

| Reactant mixing in 1000 g NMP: | 25 minutes |
| Polymerization time at 20 percent concentration: | 16 hours |
| Polymerization temperature: | 20-30° C. |
| Cyclization time: | 20 hours |
| Cyclization temperature: | 25-30° C. |

Data on the polymer and intermediate polyamic acid appears in Table 1.

Example IV - Polyimide of 6FDA/4,4'Diamine

Following the procedure of Example I, the following materials were used:
133.6 grams 2,2'-bis(4-aminophenyl) hexafluoropropane
177.60 grams 6FDA
1418.00 grams freshly distilled NMP
393.50 grams acetic anhydride
39.35 grams beta-picoline.
Reaction times and temperatures (approximate) appear below:

| Reactant mixing in 1000 g NMP: | 35 minutes |
| Polymerization time at 20 percent concentration: | 19 hours |
| Polymerization temperature: | 20-25° C. |
| Cyclization time: | 20 hours |
| Cyclization temperature: | 25-30° C. |

Data on the polymer and intermediate polyamic acid appear in Table 1.

Example V - Polyimide of 6FDA/3,4 Diamine

This example relates to a polymer of 2-(3-aminophenyl)- 2-(4-aminophenyl)hexafluoropropane and 2,2;-bis(3,4 phenyl)hexafluoropropane dianhydride. The aforementioned polymer and its components are described in copending patent application U.S. Ser. No. 252,428 filed Sept. 30, 1988 of R. Vora et al., the disclosure of which is incorporated herein by reference. The diamine is prepared in a six (6) step process using 2-(4-methylphenyl)hexafluoropropane-2-ol and benzene as starting ma follows:

(a) Preparation of 2-(4-methyl-phenyl)-2-phenylhexafluoropropane.

1290 g of 2-(4-methylphenyl) hexafluoropropane-2-ol and 780 g of benzene were placed in a 5-liter steel autoclave and 1500 g of anhydrous hydrogen fluoride were pumped into the sealed autoclave. The reaction mixture was heated at 170°-175° C. stirring for 64 hours. After completion of the reaction, hydrogen fluoride gas was allowed to escape at 80° C., and the liquid product was then washed twice with water, dried over calcium chloride, and fractionally distilled. Boiling point 135°-136° C./1.4 mbar.
Yield: 1424 g (89.5%).

(b) Preparation of 2-(4-carboxyphenol)--phenyl-hexafluoropropane.

298 g of 2-(4-methylphenyl)-2-phenyl-hexafluoropropane prepared in step (a), 2.49 g of cobalt (II) acetate tetrahydrate, 2.45 g of manganese (IV) acetate tetrahydrate, and 0.41 g of hydrogen bromide (corresponding to 4.1 g 10% HBr solution in glacial acetic acid) were placed in a 1-liter glass autoclave. The mixture was heated under an oxygen pressure of 6.5 bar up to approximately 180° C. with an exothermic reaction, and was allowed to stand for 1 hour at 170°-180° C. 200 g of acetic acid was then distilled from the reaction solution which was cooled to approximately 100° C. 275 g of water was added slowly to the solution remaining in the flask (approximately 600 g) at the boiling point. The carboxylic acid that crystallized out was filtered by suction and washed twice with 75-ml portions of 50% aqueous acetic acid and five times with 85-ml portions of water, and was dried at 60° C./60 mbar.
Yield: 311 g (95.5%).

(c) Preparation of 2-(4-carboxyphenol)-2(3-nitrophenyl) hexafluoropropane.

261 g of 2-(4-carboxyphenyl)-2-phenylhexafluoropropane prepared in step (b) was suspended in 500 ml of methylene chloride, and after the addition of 188 ml of concentrated sulfuric acid, 75 ml of concentrated nitric acid was added dropwise at −5 to 0° C. The reaction mixture was stirred for 1 hour longer at this temperature and was then poured onto 2000 g of ice. The solid was filtered off and washed with water until the rinse water had a pH of 3-4. Crude product 208 g, M.p. 180°-185° C. Workup of the filtrate: The organic phase was separated, washed twice with water, dried over magnesium sulfate, and evaporated. The sticky yellow residue was recrystallized twice from toluene, after which an additional 30 g of crude product was obtained with a melting point of 180°-184° C. The combined amount of crude product (238 g) was recrystallized twice from toluene, after which 186 g (63%) of white solid was obtained that had a purity of 99.2%, determined by gas chromatography.

(d) Preparation of 2-(4-carbamoylphenyl)-2-(nitrophenyl)hexafluoropropane.

198 g of 2-(4-carboxyphenyl)-2-(3-nitrophenyl)-hexafluoropropane prepared in step (c) was introduced into a mixture of 700 ml of concentrated sulfuric acid and 350 ml of oleum (65%). After the addition of 200 g of sulfamic acid, the reaction mixture was heated for 3 hours at 90°-95° C. The suspension, cooled to approximately 20° C., was poured onto approximately 6 kg of ice with constant stirring. The precipitated solid was then filtered off and washed with water until neutral. Yield: 191 g (97%) of white solid. M.p.: 147°-148° C.
Preparation 4,4'-bis[2-(3-nitrophenyl)hexafluoroisopropyl]azobenzene. 157 g of 2(4-carbamoylphenyl)-2-(3-nitrophenyl)-hexafluoropropane prepared in step (d) was introduced at 0 to 5° C. into a mixture of 900 ml of 13% aqueous sodium hypochlorite solution, 150 ml of 50% sodium hydroxide solution, and 5 ml of tricaprylmethylammonium chloride. The suspension was stirred for 24 hours, during which the reaction temperature was not to exceed 50° C. The reaction mixture was neutralized with dilute acetic acid, and the solid was filtered off and washed with water. After recrystallization of the dried crude product (149 g), 61 g of a solid was obtained with a melting point of 185°-187° C. The workup of the mother liquor provided an additional 14 g of the product. Yield: 75 g (52%).

(f) Preparation of 2-(3-aminophenyl)-2-(4-aminophenyl)hexafluoropropane 74.2 g of 4,4'-bis[2-(3-nitrophenyl)hexafluoroisopropyl]azobenzene prepared in step (e) was dissolved in 600 ml of ethyl acetate, 1 g of 5% Pd/C was added, and the mixture was reduced with hydrogen (100 bar) in an autoclave, first at 25° C., and when the reaction subsided, at 100° C. After filtering off the catalyst, the solvent was removed. The residue was taken up in dilute hydrochloric acid and treated with acivated charcoal. The colorless filtrate obtained from this was neutralized with half-concentrated ammonia solution. The precipitate that separated was filtered off, washed with water, and dried to constant weight.

Yield: 48 g (72%) of white solid. M.p.: 142°-143° C.

To prepare the polymer a three necked flask was fitted with a condenser thermometer, stirrer and under nitrogen atmsphere, 6.68 grams (0.02 mole) of 2-(3-aminophenyl)-2-(4-aminophenyl)hexafluoropropane was charged along with 20 grams of distilled N-methyl pyrrolidone (NMP). The mixture was stirred until a clear solution was obtained. To this clear, pale yellow colored solution was added 8.88 grams (0.02 mole) of 2,2-bis(3,4 dicarboxyphenyl)hexafluoropropane dianhydride (6FDA) while stirring was continued. 42 grams of NMP was then added to the reaction mixture and agitation at room temperature was continued for a period of about 20 hours. The resulting polyamide-acid (polyamic acid) had an inherent viscosity of 0.42 dl/g, measured at 25° C. as shown in Table 1.

The polyamide-acid was imidized as follows: 15.5 grams of acetic anhydride and 1.6 grams of beta-pioo-line were added to the polyamide-acid solution. The reaction mixture was stirred for about 20 hours at room temperature and the resulting polyimide was precipitated in methanol, washed with fresh methanol and dried for 4 hours in a vacuum oven at 125° C. The polymer was found to be soluble in NMP, tetrahydrofuran, acetone, MEK, diglyme, DMAc, chloroform and BLO solvents.

The polymer system had the following characteristics shown in Table 1.

MEMBRANE FABRICATION

In general, membranes to the above polymers were solution cast to form a membrane for permeability testing by either method A or B.

Method A

A ten to twenty-five per cent (10-25%) polymer solution (based on weight) in γ-butyrolactone: propyleneglycol methyl ether acetate (50:50 by weight) was cast onto a glass plate at 25° C. with a predetermined knife gap. The films were dried on the plate for 16 hours at 50° C., 24 hours at 150° C under vacuum, and 24 hours at 260° C. under vacuum. The films were stripped off the plate in a water bath.

Method B

A five to fifteen per cent (5-15%) polymer solution (based on weight) in methylene chloride was poured inside a metal ring on a glass plate, in a glove bag containing methylene chloride saturated atmosphere. After four hours, the plate was removed from the glove bag and immersed in a water bath to lift the film. The film was dried in a vacuum oven for 12 hours at ambient temperature, 24 hours at 50° C., and 18 hours at 200° C.

Specifics for each polymer are given below.

TABLE I

POLYMER MOLECULAR WEIGHT, INHERENT VISCOSITY AND THERMAL PROPERTIES

| Example | Polyamic Acid IV | Polyimide $M_w$ | Polyimide $M_n$ | Polyimide Polydispersity | Polyimide IV | Polyimide $T_g$ °C. | Polyimide TGA, 5% wt. loss |
|---|---|---|---|---|---|---|---|
| I | 0.70 | 62,950 | 37,670 | 1.7 | 0.56 | 239° C. | 550° C. |
| II | 0.90 | 107,000 | 45,530 | 2.3 | 0.67 | 355° C. | 535° C. |
| III | 1.06 | 174,100 | 65,500 | 2.66 | 0.83 | 247° C. | 540° C. |
| IV | 1.09 | 209,000 | 96,400 | 2.2 | 0.95 | 322° C. | 525° C. |
| V | 0.42 | 42,130 | 13,860 | 3.1 | 0.31 | 285° C. | 520° C. |

Example VI

The polymer of Example I, BTDA/3,3' diamine polyimide was formed into a membrane of 65 microns in thickness using the procedure outlined above in Method B.

Example VII

The polymer of Example II, BPDA/4,4' diamine polyimide, was formed into a membrane of 65 microns in thickness using the procedure of Example VI.

Example VIII

The polymer of Example III, 6FDA/3,3' diamine polyimide was formed into a membrane of 25 microns in thickness using the procedure outlined above in Method A.

Example IX

The polymer of Example IV, 6FDA/4,4' diamine polyimide was formed into a membrane of 25 microns in thickness using the procedure of Example VIII.

Example X

The polymer of Example V, 6FDA/3,4 diamine polyimide was formed into a membrane of 25 microns in thickness using the procedure of Example VIII.

PERMEABILITY MEASUREMENTS

Each of the membranes of Examples VI-X were tested for permeability with respect to helium, methane, carbon dioxide, oxygen and nitrogen. The method used is described in ASTM—d ,—1434-82 (manometric method). Basically, the dynamic measurement of films is carried out by use of Barrer,s Time Lag experiment.

The membrane is sandwiched in a steel cell which is connected to a tubing system and reservoir inside of a temperature controlled environment. Initially, the system is evacuated on both sides for several hours followed by a leak rate measurement. Gas is admitted on one side of the sample at a fixed pressure; this up-stream pressure is much greater than the downstream pressure so that changes in the pressure differential due to permeation can be ignored. The downstream increase in pressure (minus the measured leak rate) is recorded and plotted with respect to time with a digital equipment PDP/11 micro computer. The results for each of the membranes of Examples VI-X appears in Table II below.

TABLE II

Permeabilities and permselectivities of various gases at 35° C.
The upstream pressure was 10 atm for He, $CO_2$, $N_2$ and $CH_4$, and was 2 atm for $O_2$ and $H_2$.

| Membrane Of | $PH_2$ | PHe (*) | $\frac{PHe}{PCH_4}$ | $PCO_2$ (*) | $\frac{PCO_2}{PCH_4}$ | $PO_2$ (*) | $\frac{PO_2}{PCH_4}$ | $PN_2$ (*) | $\frac{PN_2}{PCH_4}$ | $PCH_4$ (*) | $\frac{PO_2}{PN_2}$ |
|---|---|---|---|---|---|---|---|---|---|---|---|
| Example VI | — | 17.0 | 1214 | 1.05 | 75.0 | 0.39 | 27.9 | 0.044 | 3.1 | 0.014 | 8.9 |
| Example VII | 54 | 58.0 | 76.3 | 27.4 | 36.1 | 6.65 | 8.75 | 1.21 | 1.6 | 0.76 | 5.5 |
| Example VIII | — | 48.0 | 600 | 5.1 | 63.3 | 1.80 | 22.5 | 0.26 | 3.2 | 0.08 | 7.0 |
| Example IX | — | 145.0 | 85 | 63.6 | 37.4 | 17.9 | 10.5 | 3.70 | 2.2 | 1.70 | 4.8 |
| Example X | — | 73.1 | 212 | 18.6 | 53.9 | 5.15 | 14.9 | 0.84 | 2.4 | 0.345 | 6.1 |

(*)Permeabilities in Barrers,

1 Barrer = $10^{-10} \frac{cm^3 (STP) cm}{cm^2 \sec cmHg}$

It will be appreciated that the measured permeabilities are approximately independent of pressure at the pressures utilized. FIG. 1 is a plot of separation factor with respect to oxygen and nitrogen versus oxygen permeability. It may be noted that the membranes of Examples VI & VIII show remarkably high ideal separation factors as well as reasonable permeation rates for oxygen; while the other membranes exhibit very high flux rates as well as reasonable separation factors.

The invention has been described in detail hereinabove with respect to multiple embodiments and accordingly, further explanation, data and examples are deemed unnecessary. Various modifications will be obvious to those of ordinary skill in the art; which modifications are within the spirit and scope of the present invention which is limited and defined only by the appended claims.

We claim:

1. In a process for separating gasses comprising bringing two or more gasses under pressure into contact with one side of a molecularly permeable membrane formed of an aromatic polyimide such that a portion of said gasses is forced through said membrane, the improvement comprising utilizing a polymeric membranous structure having recurring units of the chemical formula

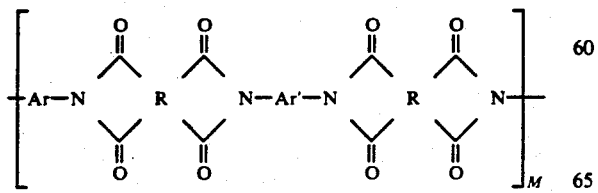

where:
m is an integer from about 15 to about 250

R is a tetravalent aromatic radical selected from the group consisting of:

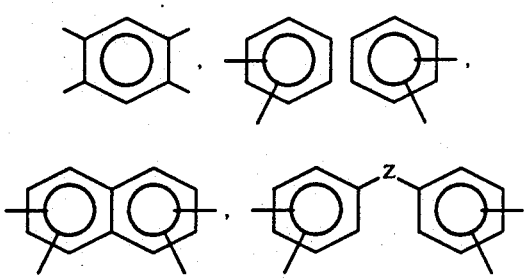

or mixtures thereof;

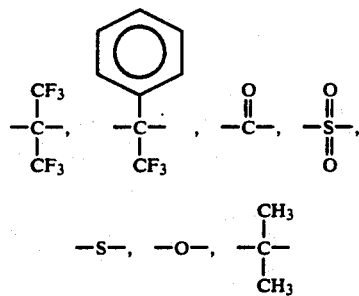

or mixtures thereof;

Ar' is

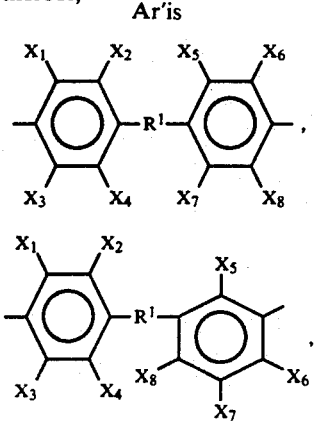

-continued

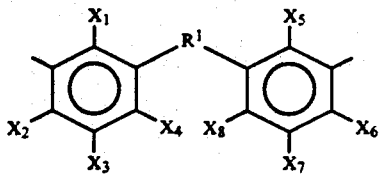

or mixtures thereof;
$X_1, \ldots X_8$ being defined hereinbelow

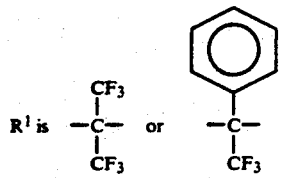

or mixtures thereof

Ar' is

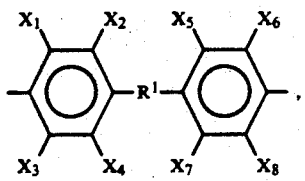

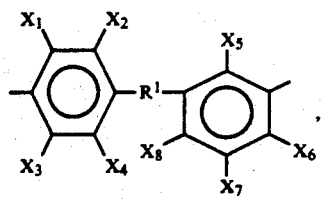

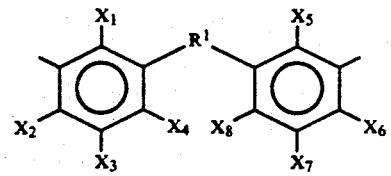

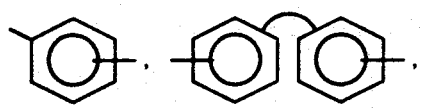

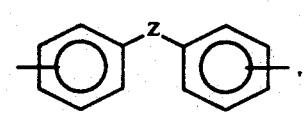

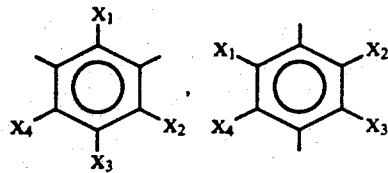

or mixtures thereof;
R', Z being defined as hereinabove; $X_1 \ldots X_8$ are independently H, alkyl groups with 1-6 carbon atoms; Br, Cl; or aromatic groups with 6-13 carbons where Ar and Ar' are nonidentical where Ar and Ar' are nonidentical.

2. The process according to claim 1, wherein said membrane exhibits a permeability of at least about 15 Barrers with respect to helium.

3. The process according to claim 2, wherein said membrane exhibits a permeability of at least about 0.4 Barrers with respect to oxygen.

4. The process according to claim 3, wherein said membrane exhibits a permeability of at least about 0.05 Barrers with respect to nitrogen.

5. The process according to claim 1, wherein said membrane exhibits an ideal separation factor of at least about 85 with respect to a helium/methane mixture.

6. The process according to claim 1, wherein said membrane exhibits an ideal separation factor of at least about 35 with respect to a carbon dioxide/methane mixture.

7. The process according to claim 1, wherein said membrane exhibits an ideal separation factor of at least about 2 with respect to a nitrogen/methane mixture.

8. The process according to claim 1, wherein said membrane exhibits an ideal separation factor of at least about 5 with respect to an oxygen/nitrogen mixture.

9. A polymeric membranous structure for gas separation having recurring units of the chemical formula;

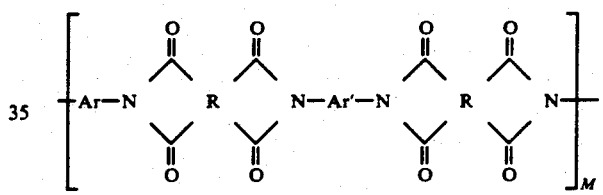

where:
m is an integer from about 15 to about 250
R is a tetravalent aromatic radical selected from the group consisting of

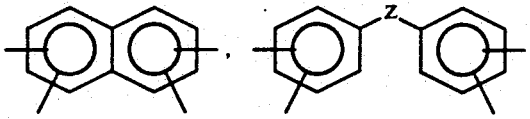

or mixture thereof;
Z is a divalent radical selected from:

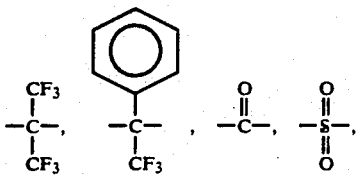

-continued $-S-$, $-O-$, $-\underset{\underset{CH_3}{|}}{\overset{\overset{CH_3}{|}}{C}}-$ or mixtures thereof;

Ar is

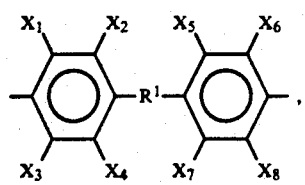,

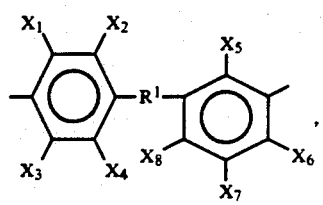,

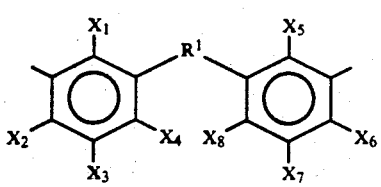

or mixtures thereof;

$X_1 \ldots X_8$ being defined hereinbelow $R^1$ is 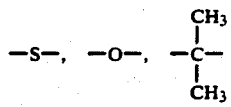

or mixtures thereof;

Ai is

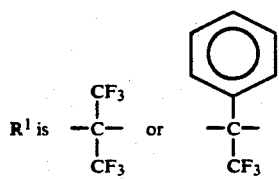,

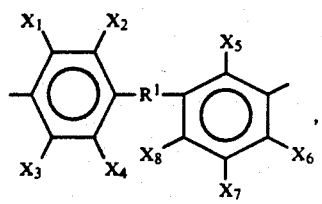,

-continued

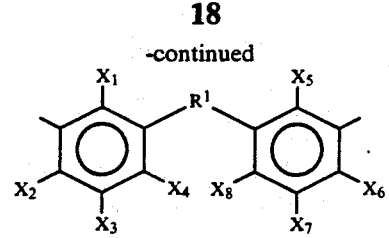

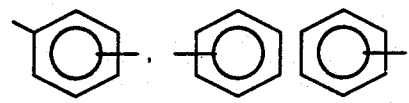,

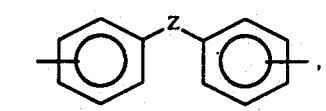,

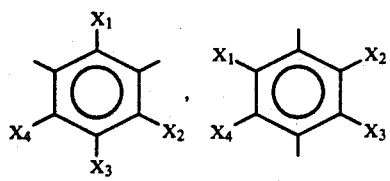,

or mixtures thereof;

R', Z being defined as hereinabove;

$X_1 \ldots X_8$ are independently H, alkyl groups with 1-6 carbon atoms; Br, Cl; or aromatic groups with 6-13 carbons where Ar and Ar' are nonidentical.

10. The membrane according to claim 0, wherein said membrane exhibits a permeability of at least about 15 Barrers with respect to helium 11. The membrane according to claim 10, wherein said membrane exhibits a permeability of at least about 0.4 Barrers with respect to oxygen.

12. The membrane according to claim 11, wherein said membrane exhibits a permeability of at least about 0.05 Barrers with respect to nitrogen.

13. The membrane according to claim 9, wherein said membrane exhibits an ideal separation factor of at least about 85 with respect to a helium/methane mixture.

14. The membrane according to claim 9, wherein said membrane exhibits an ideal separation factor of at least about 35 with respect to a carbon dioxide/methane mixture.

15. The membrane according to claim 9, wherein said membrane exhibits an ideal separation factor of at least about 2 with respect to a nitrogen/methane mixture.

16. The membrane according to claim 9, wherein said membrane exhibits an ideal separation factor of at least about 5 with respect to an oxygen/nitrogen mixture.

17. A membrane for gas separation consisting of a polymeric condensation product of a diamine selected from the group consisting of 2,2,-bis(3-aminophenyl)-hexafluoropropane, 2,2'-bis(4-aminophenyl)hexafluoropropane and 2-(3-aminophenyl)-2'-(4-aminophenyl)hexafluoropropane or mixtures thereof and a - dianhydride selected from the group consisting of 3,3', 4,4'benzophenone tetracarboxylic acid dianhydride, 2,2-bis(3,4 dicarboxyphenyl)hexafluoropropane dianhydride, 3,33',4,4'diphenyl tetracarboxylic acid dianhydride and mixtures thereof 18. The membrane according to claim 17, wherein said polymeric condensation product has a molecular weight, $M_w$ of at least about 100,000.

UNITED STATES PATENT AND TRADEMARK OFFICE
CERTIFICATE OF CORRECTION

PATENT NO. : 5,074,891

DATED : December 24, 1991

INVENTOR(S) : R.S. Kohn et al

It is certified that error appears in the above—identified patent and that said Letters Patent is hereby corrected as shown below:

In Claim 1, column 14, lines 36, insert --Z is a divalent radical selected from:-- before the structure beginning at line 39.

In Claim 1, column 16, lines 1-2, delete "where Ar and Ar' are nonidentical" in the first instance.

In Claim 9, column 17, line 50, change "Ai" to --Ar'--.

Signed and Sealed this

Twenty-second Day of March, 1994

Attest:

BRUCE LEHMAN

Attesting Officer

Commissioner of Patents and Trademarks